US006766436B2

(12) United States Patent
Makoto et al.

(10) Patent No.: US 6,766,436 B2
(45) Date of Patent: Jul. 20, 2004

(54) DATA PROCESSOR HAVING AN ADDRESS TRANSLATION CIRCUIT

(75) Inventors: Saen Makoto, Kokubunji (JP); Kei Suzuki, Kokubunji (JP); Takashi Okada, Tama (JP)

(73) Assignee: Hitachi, Ltd., Tokyo (JP)

( * ) Notice: Subject to any disclaimer, the term of this patent is extended or adjusted under 35 U.S.C. 154(b) by 219 days.

(21) Appl. No.: 10/083,346

(22) Filed: Feb. 27, 2002

(65) Prior Publication Data
US 2002/0184467 A1 Dec. 5, 2002

(30) Foreign Application Priority Data

Jun. 5, 2001 (JP) ........................................ 2001-168943

(51) Int. Cl.[7] ............................................. G06F 12/10
(52) U.S. Cl. ..................... 711/220; 711/202; 345/568
(58) Field of Search ............................. 711/6, 200, 220, 711/202; 345/508; 714/702

(56) References Cited

U.S. PATENT DOCUMENTS 4,212,057 A * 7/1980 Devlin et al. ............... 711/151
5,086,295 A * 2/1992 Boettcher et al. ........... 345/605
6,289,430 B1 * 9/2001 Broberg et al. .............. 711/203

FOREIGN PATENT DOCUMENTS

| JP | 3-97051 | 4/1991 |
| JP | 3-113548 | 5/1991 |
| JP | 4-237348 | 8/1992 |

* cited by examiner

Primary Examiner—Matthew Kim
Assistant Examiner—H. B. Patel
(74) Attorney, Agent, or Firm—Mattingly, Stanger & Malur, P.C.

(57) ABSTRACT

In the address translation, there is a region in which the translation having a common regularity is possible into a plurality of regions, and a region in which such a translation is not possible. An address translation circuit is disposed between a master circuit and a slave circuit. The address translation to the former region is performed by a first address translation system in which the translated address is produced by a manipulation including permutation of a part of the original address, and the address translation to the latter region is performed by a second address translation system in which a part of the original address is replaced with translated address information stored beforehand. The data processor includes the address translation circuit having both of the first and second address translation systems.

4 Claims, 17 Drawing Sheets

DATA PROCESSOR HAVING AN ADDRESS TRANSLATION CIRCUIT

BACKGROUND OF THE INVENTION

1. Field of the Invention

The present invention relates to a data processor having an address translation circuit.

2. Description of the Related Art

The data processor which is the object of the present invention is an LSI chip including an arithmetic circuit such as a CPU and a digital signal processor or the like and a storage circuit, or is a board formed by a plurality of LSI chips. In the present specification, these circuits (CPU, DSP, or circuits which performs image information processing such as an MPRG decoder or a graphics processing circuit, or the like) which themselves issue an access request to other circuits are defined as master circuits, and conversely, these circuits (a memory or the like) which receive an access request from other circuits and perform processing are defined as slave circuits.

In recent data processors, the need for mounting an address translation circuit in addition to a master circuit and a slave circuit has been increased. The main reasons for this include the following two points.

Firstly, the first reason is caused due to the fact that the data processor has become to include a plurality of master circuits. Accompanied by higher function of application assisted by the improvement in the degree of integration of LSI, the function integrated on the LSI is increased, that is, the number of master circuits is increased. Also, since the master circuit has a slave circuit, if any countermeasure is not taken, the number of slave circuits will be increased as the master circuits become plural in number. However, in the data processor having a plurality of master circuits, since it is possible to reduce the overall cost of the data processor, if the master circuits can share the data mutually and if overlapped slave circuits can be reduced, the plurality of master circuits are made to share the slave circuit.

However, for example, the master circuits of CPUs, graphics processing circuits or the like have respectively inherent address maps. Here, the address map refers to the allocation of address indicating by which address each data is to be accessed, and respective master circuits have inherent address maps, and normally these address maps are different for each master circuit. Accordingly, in order to realize a data processor having a plurality of master circuits, it becomes necessary to change software. But, since a large amount of man-power and costs are required to change the software, it is beneficial to suppress the change to a minimum level as far as possible in view of the man-power of the programmer and the cost, even-though some extent of change of the software is unavoidable.

Therefore, in order to enable to use the already developed software with lesser program change, it is effective to use an address translation circuit. By connecting the address translation circuit between the master circuit and the slave circuit, the address contained in the request from the master circuit to the slave circuit is translated. For example, in a data processor including a CPU and a graphics processing circuit as the master circuit, address translation circuits will be respectively added to the output parts of the CPU and the graphics processing circuit.

Secondly, the second reason is caused by the need that the processing which requires a wider address space than that of the master circuit of the already existing CPU or the like is desired to be performed by the data processor using the existing master circuit. Specifically speaking, it corresponds to such a case in which the newest program of a large scale is desired to be executed by a CPU of one generation before.

As described above, the address translation circuit is a circuit which is connected between circuits having different address maps, and produces a translated address from the input original address.

Here, if the increase of the circuit scale of the address translation circuit is not disagreeable, the above-mentioned need will be met by an address translation method in which the address translation circuit is provided with a storage means for storing upper bits of the address after translation. That is, this is an address translation method in which a value stored in the above-mentioned storage means at the time of access of the master circuit is connected to lower bits of the address before translation thereby to form a translated address.

According to the above-mentioned address translation method, it is possible to dispose a certain region on the original address space on an arbitrary position on a translated address space, and also by updating the translated address information, it becomes possible to access from a narrow address space to a wider address space.

However, in the above-mentioned address translation method, at the time of access of the master circuit to a different part of the address space, since it is necessary to access after setting the address information storage, many changes are caused in the software which was produced for the existing circuit. Also, there is a drawback in which the processing speed is decreased due to updating of the translated address information storage.

SUMMARY OF THE INVENTION

Accordingly, the problem of the present invention is to reduce the changes in the software which has already been developed, in the data processor comprising a plurality of master circuits including a circuit having the software which has already been developed, and an address translation circuit in addition to one or a plurality of slave circuits shared by the plurality of master circuits, the address translation circuit being mounted between the plurality of master circuits and the slave circuits. Also, the problem is to suppress the increase of the circuit scale of the address translation circuit.

The above-mentioned problem or object, and novel features of the present invention will become apparent from the description in the present specification and the accompanied drawings.

In the invention disclosed in the present application, the outline of the typical aspect will be explained briefly.

That is, a data processor comprises a plurality of master circuits for issuing an access request to other circuits, one or more slave circuits upon receiving the access request from the master circuits for performing a processing, and an address translation circuit disposed between the master circuits and the slave circuits, for translating an original address output from the master circuits, and for outputting a translated address to the slave circuits, wherein the number of the address translation circuit is one or more, and is equal to or less than the number of the master circuits.

In the typical aspect of the invention mentioned above, in the case of the data processor where the slave circuits are shared by the plurality of master circuits, even when an address map is different for each master circuit, by providing the address translation circuit between the master circuits and the slave circuits, the address contained in the request from the master circuits to the slave circuits can be translated by the address translation circuit. Therefore, it is possible to use the software which has been already developed with less program change. This is very advantageous both in the man-power of the programmer and in the development cost of the software.

In the invention disclosed in the present application, the outline of another typical aspect will be explained briefly below.

A data processor typical in the present application, further comprises a translated address storage part; and the address translation circuit includes a plurality of address translation sub-circuits for independently performing address translation with respect to the original address, a circuit for selecting and outputting a translated address from a translation result of the plurality of address translation sub-circuits contained in the address translation circuit in accordance with address translation system selection information; and at least one of the address translation circuits receives as inputs address translation system selection information in addition to the original address from the master circuits, and the translated address information from the translated address storage part, and outputs the translated address to the slave circuits; and at least one of the address translation sub-circuits contained in the address translation circuit realizes an address translation system which produces the translated address by a method in which a part of the original address is replaced with translated address information stored beforehand in the translated address storage part; and at least one of the address translation sub-circuits contained in the address translation circuit realizes an address translation system which produces the translated address by a method including a permute manipulation of a part of the original address.

In the above-mentioned data processor, by constituting the data processor incorporating the address translation circuit which includes both of the circuits; one circuit realizing the address translation system by replacing a part of the original address with a value stored beforehand, and the other circuit realizing the address translation system by a method including the permute manipulation of a part of the original address, it enables the master circuit to perform the processing which requires a wider address apace than its own address apace. That is, such a processing can be performed by the data processor which uses the existing master circuit. By using the address translation circuit having two kinds of address translation systems, since there is no need to perform the address translation in which the storage means for storing the upper bits of the address after translation is included in the address translation circuit, the decrease of the processing speed is not caused, and it is possible to suppress the increase of the circuit scale of the address translation circuit.

Other objects, features and advantages of the invention will become apparent from the following description of the embodiments of the invention taken in conjunction with the accompanying drawings.

DESCRIPTION OF THE EMBODIMENTS

The embodiments of the present invention will be described with reference to the drawings.

Figure 3:
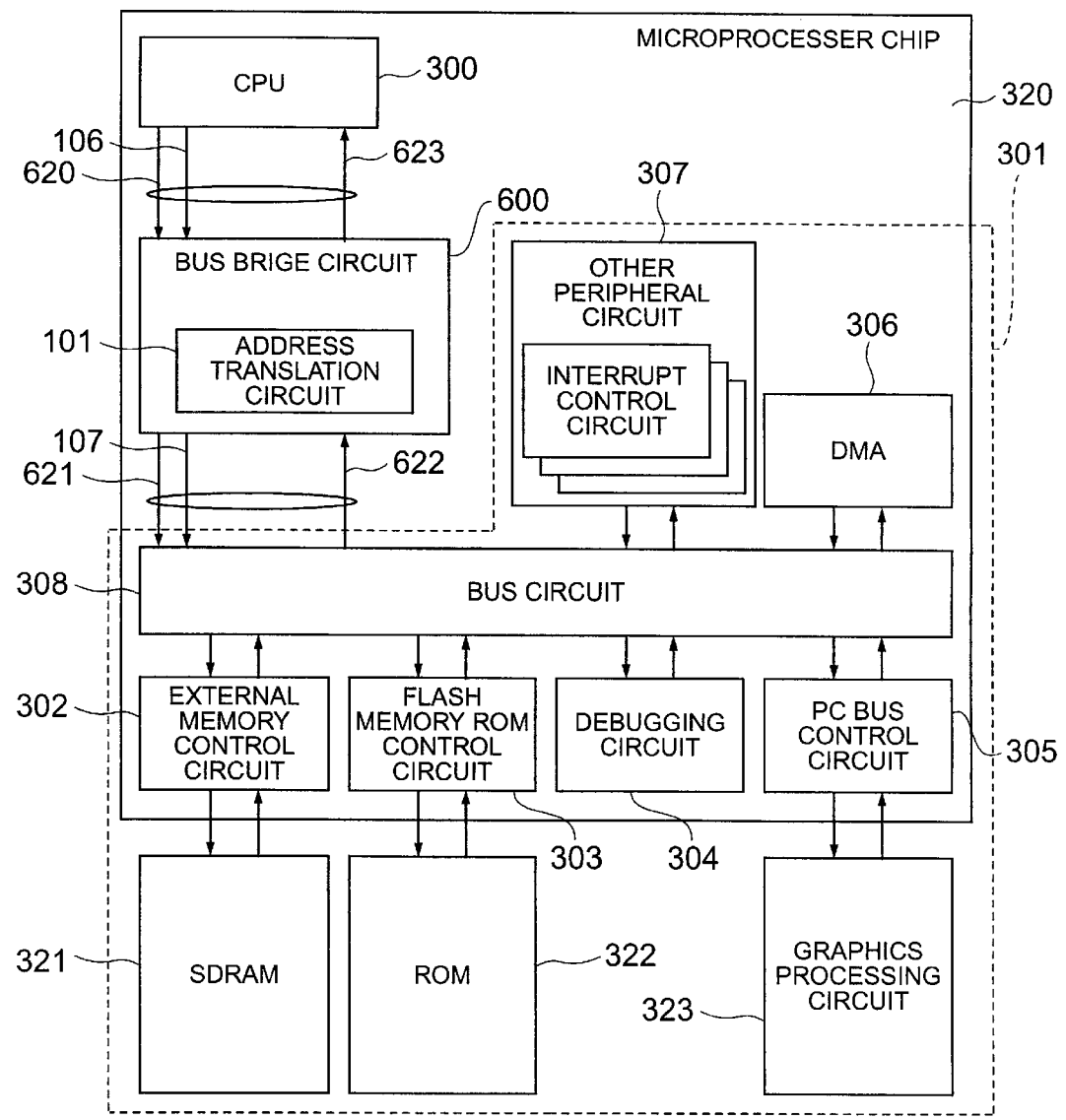
FIG. 3 is a diagram of a data processor of another embodiment of the present invention.

FIG. 3 shows one embodiment of the present invention.

This data processor is formed by connecting a CPU 300, a bus circuit 308, a debugging circuit 304 for issuing a request responsive to a designation from the outside at the time of debugging of software, a direct memory access control circuit (DMA) 306 for transferring data without intervention of the CPU, an external memory control circuit 302, a control circuit for a flash memory 303, a PCI bus control circuit 305, a microprocessor chip 320 containing an interruption control circuit and its peripheral circuit 307, a SDRAM chip 321, a ROM chip 322, and a graphics processing circuit chip 323 on a substrate. There is a bus bridge circuit 600 containing an address translation circuit 101, between the CPU 300 and the bus circuit 308 within the microprocessor chip 320. This bus bridge circuit 600 performs protocol conversion between the CPU 300 having an interface according to a protocol of a bus A and the bus circuit 308 having an interface according to a protocol of another bus B. Viewing from the bus bridge circuit 600, the CPU 300 corresponds to a master circuit, and the rest circuit connected through the bus circuit 308 corresponds to a slave circuit. The CPU 300 which is the master circuit transmits a 29 bit address 106, and other information 620 including the kind of instruction, write data or the like to the slave circuit 301 through the bus bridge circuit 600. Because the circuits other than the CPU 300 within the microprocessor chip have a 32 bit address, the address translation circuit 101 is necessary between the CPU 300 which is the master circuit and the slave circuit 301.

Figure 4:
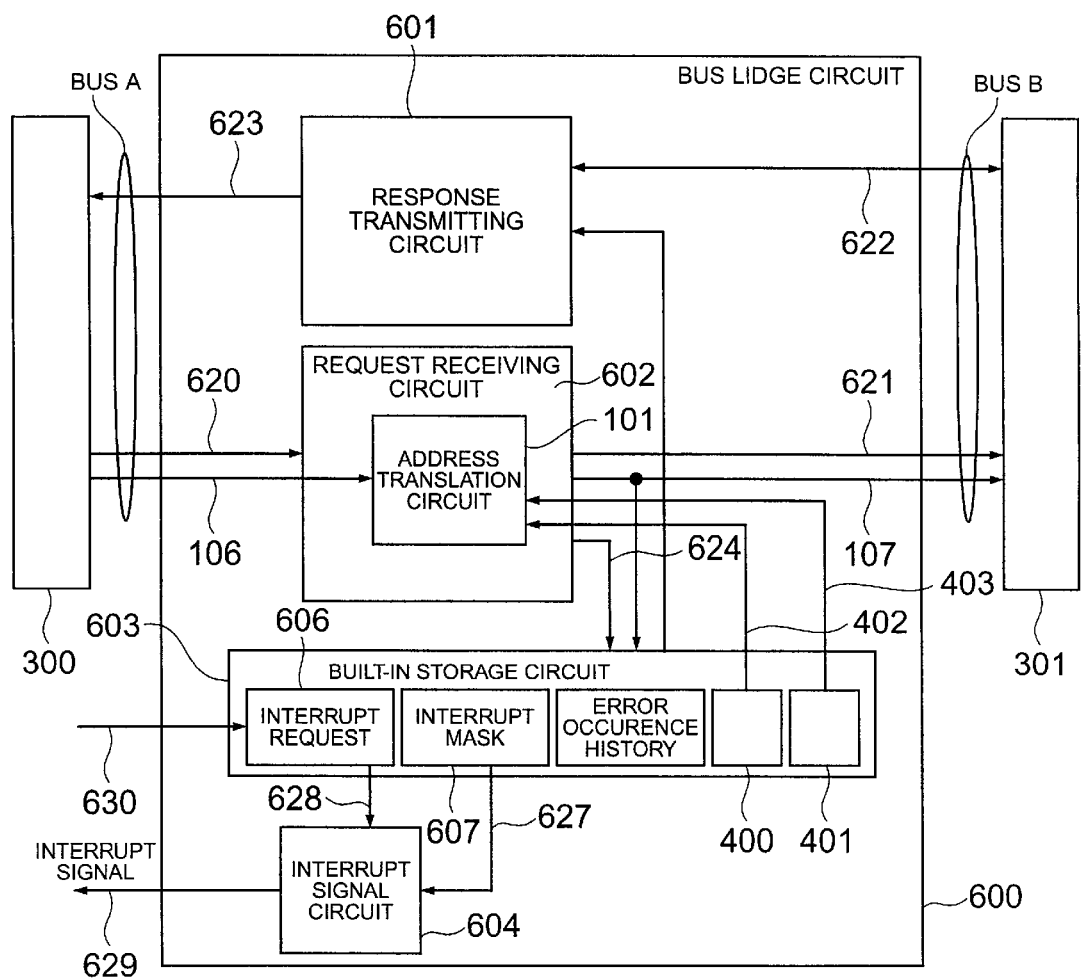
FIG. 4 is a detailed diagram of a bus bridge circuit.

Referring to FIG. 4, the details of the bus bridge circuit 600 will be described. A request receiving circuit 602 within the bus bridge circuit 600 receives the address 106 output from the CPU 300, and other information 620 such as the kind of instruction and write data or the like, and in response to the address and access destination information contained in the input, generates an access request to a slave circuit 301, or a built-in storage circuit 603. When the access request from the request receiving circuit 602 was directed to the slave circuit 301, the slave circuit 301 after performing the requested processing, returns the requested information 623 to the CPU 300 through a response transmitting circuit 601 within the bus bridge circuit 600. When the access request form the request receiving circuit 602 was access to the built-in storage circuit 623, the built-in storage circuit 623 after performing the requested processing returns the requested information 623 to the CPU 300 through the response transmitting circuit 601.

Next, the address translation circuit 101 within the request receiving circuit 602 shown in FIG. 5 will be described. This circuit 101 includes an address translation sub-circuit A 102 for realizing the address translation system A which produces a translated address 107 by replacing a part of the original address 106 output from the CPU 300 with a translated address information A 403 stored beforehand, an address translation sub-circuit B 103 for realizing the address translation system B which produces a translated address 107 by a manipulation including permuting of a part of the original address 106, and an address translation sub-circuit C 104 for realizing the other system in which the original address 106 is not changed and deficient upper bits are filled by fixed values, and further includes an address translation system selection circuit 105 for changing over these three systems.

Figure 6:
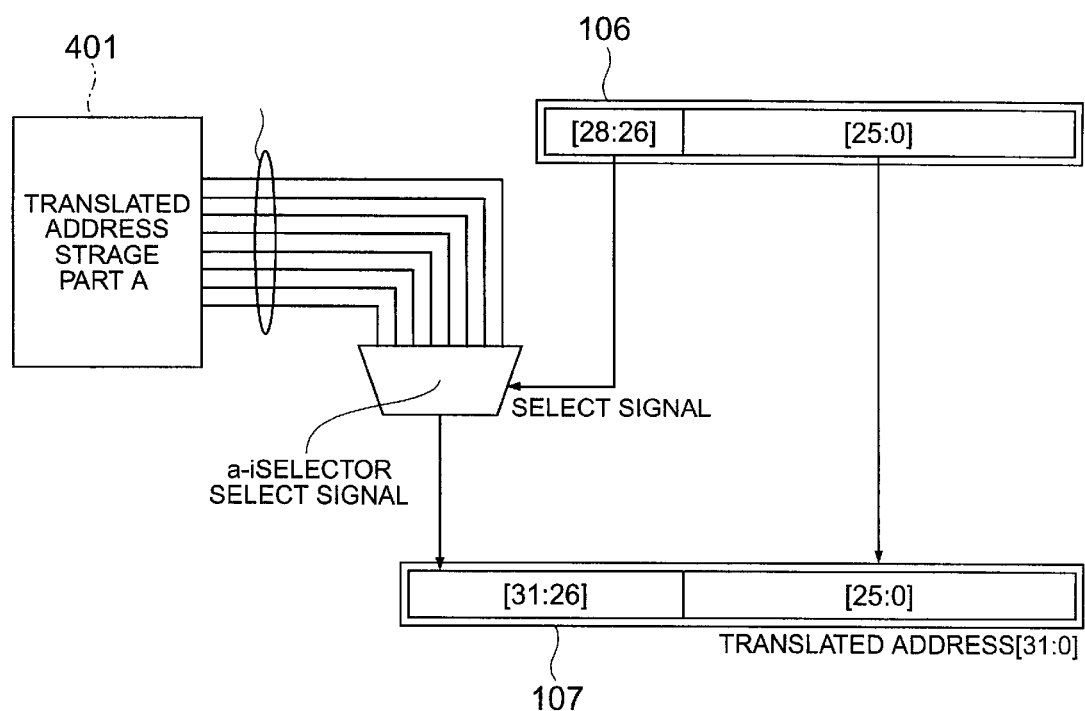
FIG. 6 is a diagram of an address translation sub-circuit A of one embodiment of the present invention.

In this embodiment, the address translation system A by the address translation sub-circuit A 102 replaces the upper bits of the original address 106 with values set beforehand in a translated address storage part A 401 (FIG. 6). The address translation sub-circuit A 102 receives as input the original address 106, and the translated address information A 403 from the translated address storage part A 401. In response to the bits from 28 bit to 26 bit (hereinafter referred to as ([28:26]) of the original address 106, one of 8 pieces of translated address information A 403 is selected, and this piece of information is made upper bits [31:26] of the translated address 107. The bits [25:0] of the translated address 107 are given by [25:0] of the original address. By virtue of this, 64 Mbyte space on the original address space can be laid out on an arbitrary region on the translated address space (FIG. 7), and this is useful in preserving the interchangeability of software. Also, if the translated address information A 403 is made to be rewritable, by performing the access while rewriting this value, it is possible to access to wider translated address space from the original address space.

Figure 5:
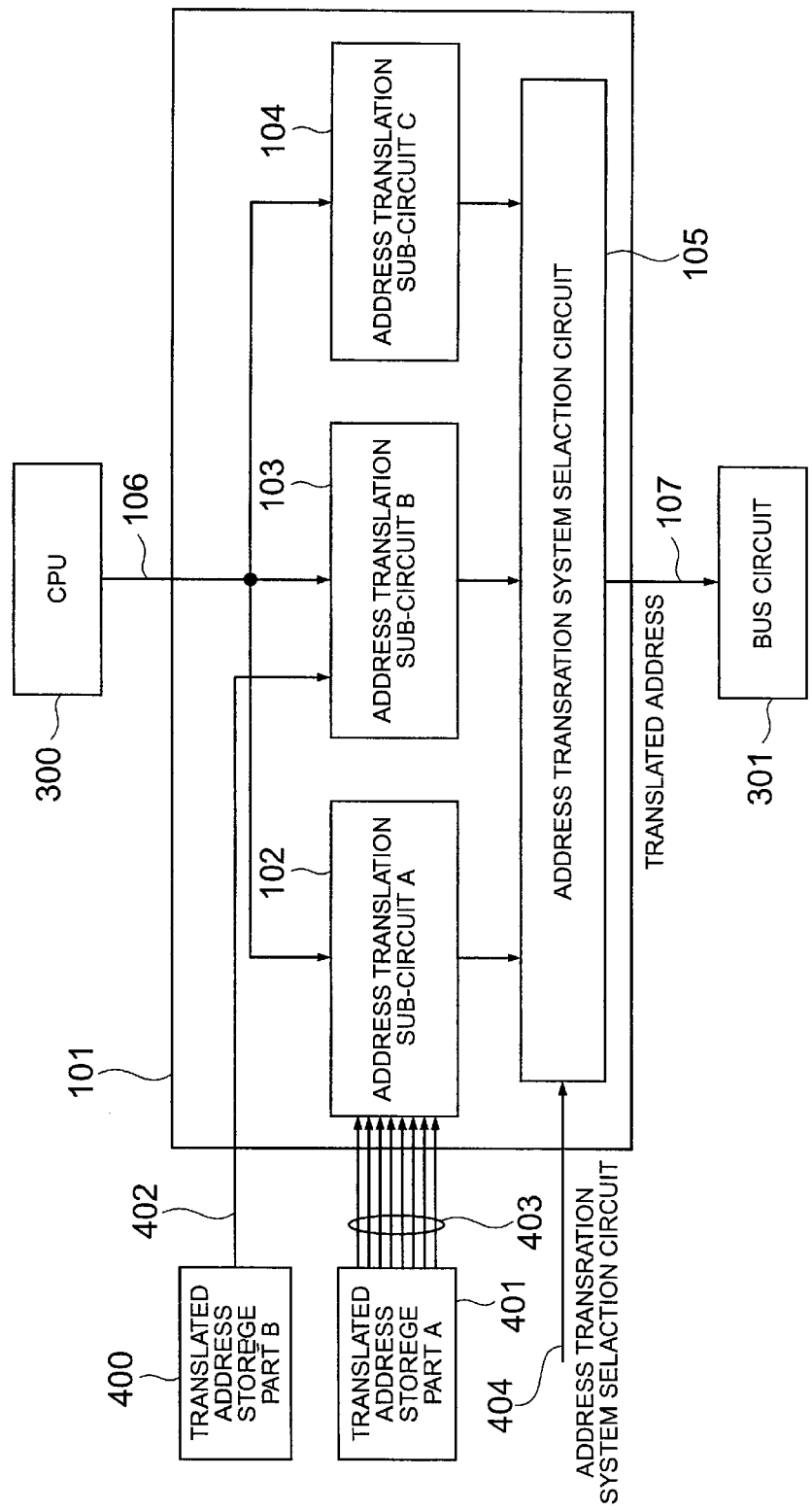
FIG. 5 is a detailed diagram of an address translation circuit.
Figure 8:
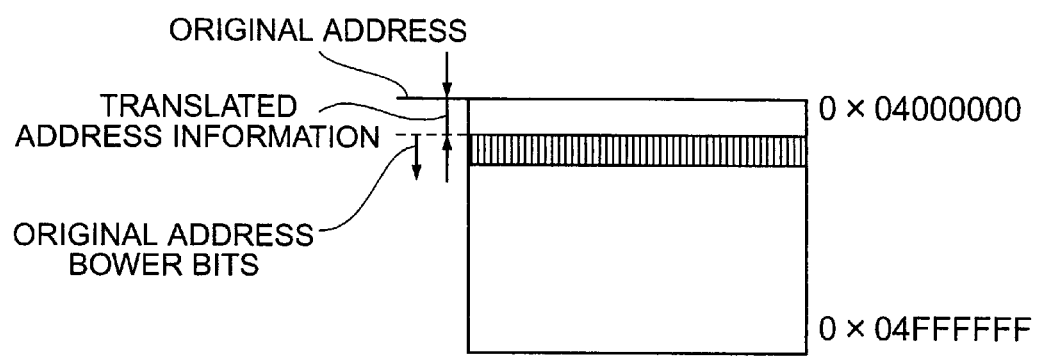
FIG. 8 is an enlarged diagram of a translated address.
Figure 9:
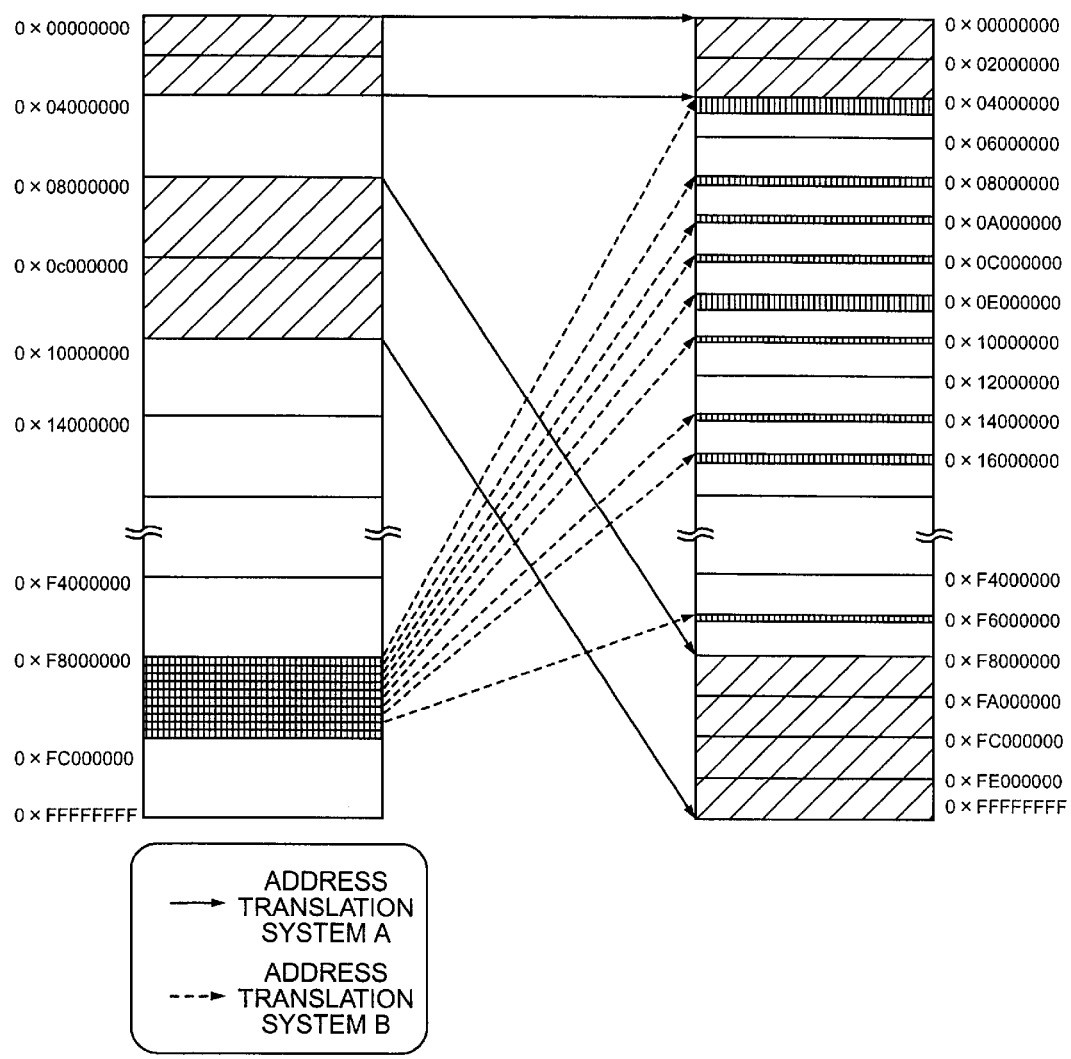
FIG. 9 shows a typical example 1 of an address translation map.
Figure 10:
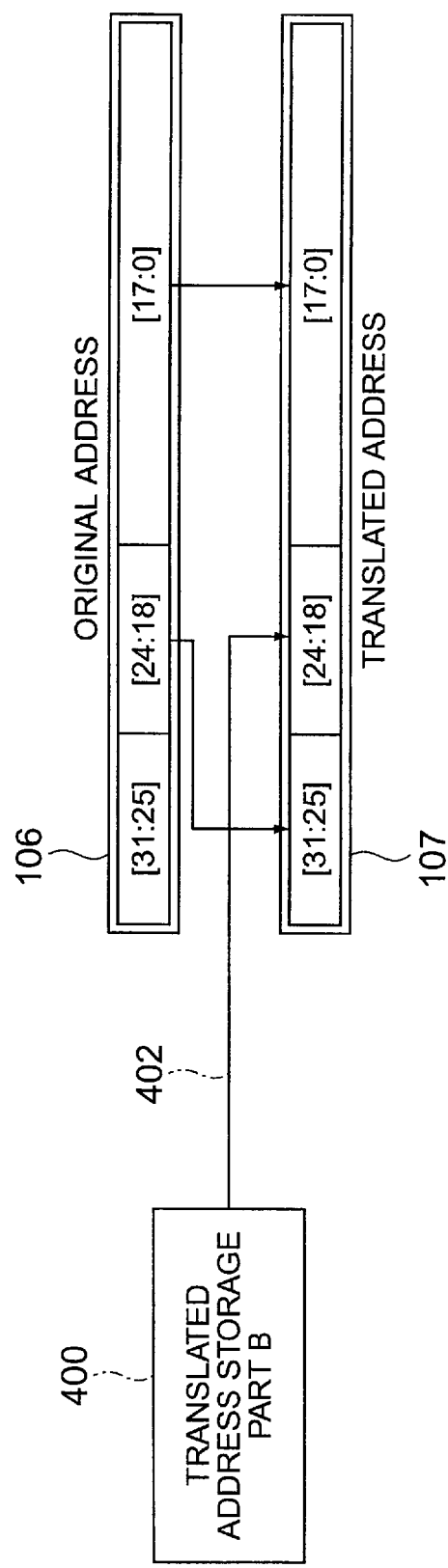
FIG. 10 is a type diagram of an address translation system B of the typical example 1 of the address translation map.

Again in FIG. 5, in the address translation system B by the circuit 103, the bits [28:0] of the original address 106, and the translated address information B 402 from the translated address storage part B 400 are received as input, and the translated address 107 is output. The address translation sub-circuit B 103, irrespective of the input values, provides original address intermediate bits [23:16] as upper bits [31:24] of the translated address 107, and provides translated address information B 402 of 8 bits as intermediate bits [23:16] of the translated address 107, and provides [15:0] of the original address 106 as lower bits [15:0] of the translated address 107. In this manner, the address translation sub-circuit B 103 performs permuting by using the intermediate bits of the original address as the upper bits of the translated address, and by filling its deficiency with the translated address information 402 (M), the translated address 107 is produced. By virtue of this, for every block of 256 blocks formed by dividing the translated address space of 4 G bytes into the 256 blocks each including 16 M bytes, it becomes possible to access to 64 k bytes from the M-th byte from the head. The intermediate bits [23:16] of the original address refers to the head address of the block, and the translated address information 402 (M) represents an offset from the head address, and the original address lower bits [15:0] is the distance from the offset (FIG. 8). By virtue of the translation by the address translation system B 103, it is possible to access from a certain narrow region to many portions extending in a wide region with regularity by a simple and small scale circuit. If all the individual regions have the magnitude of 64 k bytes or less, since there is no need to rewrite the translation address information B 402 at each time of access, the change of the software can be made small.

Also, in FIG. 5, the address translation sub-circuit C 104 is a circuit to perform the address translation merely by filing the upper bits of the original address 106 with 0s, and gives 0s to [31:29] of the translated address 107, and gives [28:0] of the original address to [28:0] of the translated address. In the present embodiment, although it is uses for accessing the built-in storage circuit, it is also necessary to directly connect a circuit designed for the circuit 300.

Again, in FIG. 5, the address translation system selection circuit 105 determines the translation system from the upper bits [28:20] of the original address 106 and a signal indicating the access destination contained in the signal 620. In other words, as the address translation system selection information 404, the original address and a signal indicating the access destination are given. As the access destination, two destinations including the access to an external memory and the access to a control register may be given. At the time of accessing to the external memory, the translated address according to the address translation system A is always selected and output. At the time of accessing to the control register, in the case where the upper bits [28:24] of the address are 0x1C or less (0x indicates not care), the translated address according to the address translation sub-circuit 104 is selected, and when the [28:24] of the original address are 0x1F, the translated address according to the address translation sub-circuit B 103 is selected, and in other cases, the translation according to the address translation sub-circuit A 102 is selected.

With respect to a plurality of regions having the regularity and allowing common translation, the address translation system B is effective. In particular, when these regions are small, the effect is large. In this case, since there is no need of processing to update the storage information for the address translation each time the access is to be made, the amount of change of the software is small. Moreover, the hardware cost is small and there is a merit also in the scale of circuit. On the other hand, with respect to the rest of the regions, the address translation system A is used. The address translation circuit 101 which uses two translation systems selectively as mentioned above, operates with small amount of change of the software developed for the existing circuit overcoming the problem, and also, it is effective in realizing the data processor including the address translation circuit operable with a small scale of circuit.

Furthermore, the bus bridge circuit 600 includes an interrupt signal producing circuit 604 for generating an interrupt signal 629. The interrupt signal 629 has a bit number corresponding to the number of interrupt factors. This circuit receives a signal 628 from interrupt request 606 within the built-in storage circuit 603, and a signal 627 from interrupt mask 607 within the built-in storage circuit 603 as input. In the interrupt request 606, interrupt information 630 output from a circuit at a bus A side, and interrupt information 631 output from a circuit at a bus B side. If a mask bit has not been asserted for the interruption, a bit corresponding to the interrupt signal is asserted. By this signal, it is possible to deal with an error occurred at an opposite side of the CPU through the bus bridge circuit 600.

Figure 1:
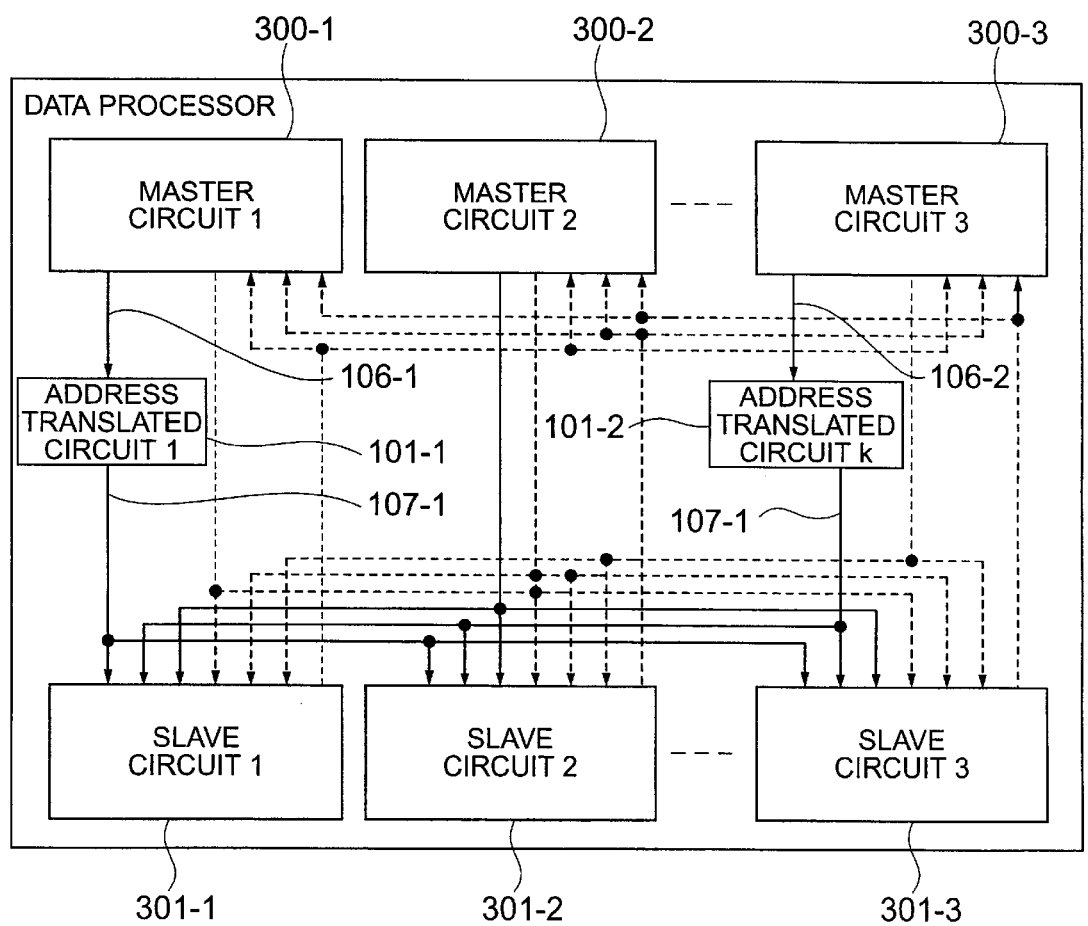
FIG. 1 is a diagram of a data processor (translated address storage part, and address translation system selection information are omitted) of one embodiment of the present invention.

FIG. 1 is a generalized diagram of the data processor of the above-mentioned embodiment. In this figure, a full line indicates a flow of address, and a broken line indicates a flow of information other than the address. The data processor which is the object of the present invention mounts one or more master circuits 300 (CPU, DSP, graphics processing circuit, bus control circuit, etc.), one or more slave circuits 301 (memory, etc.), and one or more address translation circuits 101. The data processor is allowed to incorporate a circuit having a different address map with few man-hours by including the address translation circuit 101 which is included in the present invention. Furthermore, the increase of circuit scale and the increase of execution time due to the address translation circuit can be made relatively small.

Figure 2:
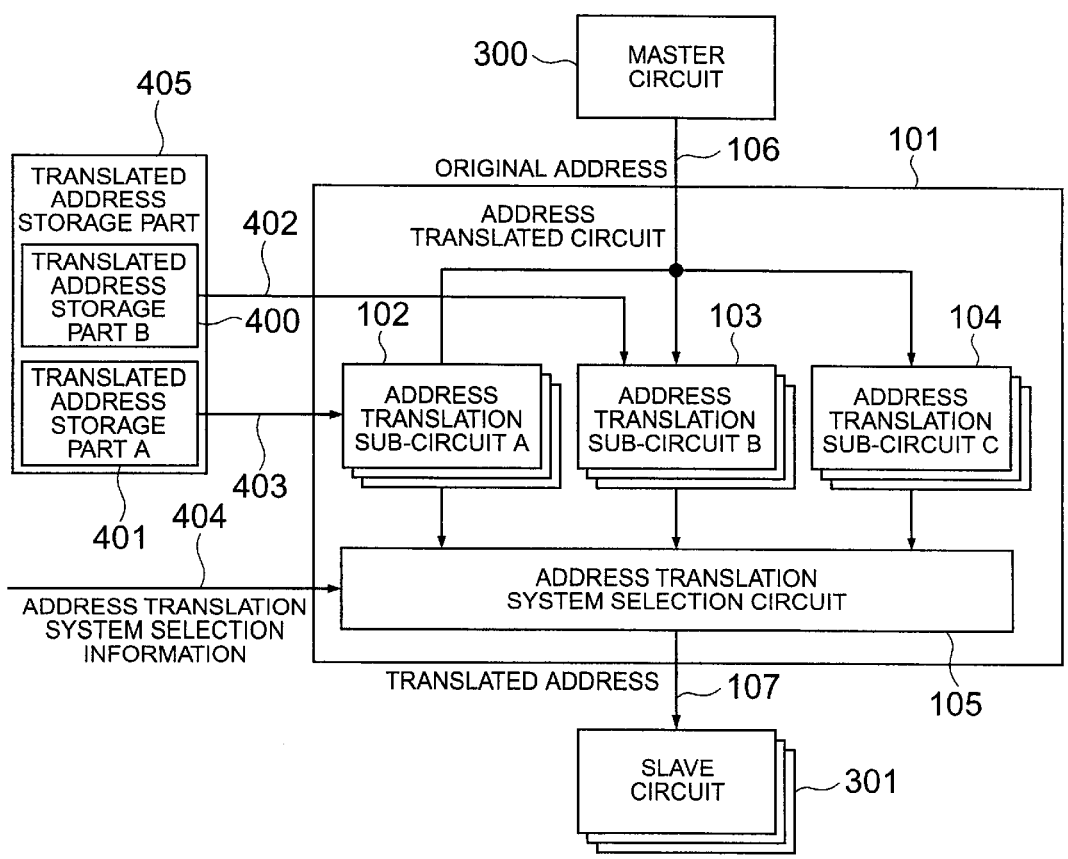
FIG. 2 is a type diagram of an address translation circuit.

The Other Embodiments of Circuit 102 for Realizing Address Translation System A In the above-mentioned embodiment, one of eight address translation part values from the translated address storage part A is selected by the upper bits of the original address, and the upper bits of the translated address are replaced with the selected value, however, the other embodiments may also be considered. This will be shown referring to FIG. 2.

First, the part which is replaced with the translated address information A 403 from the translated address storage part A 401 may be any part of the address. Furthermore, this part may be a plurality of discontinuous parts.

Also, the translated address information A 403 which is stored in the translated address storage part A 401 may be a plurality of pieces, or a piece of information. Furthermore, the selection of this value may be done by the information other than one part of the address. For example, two values are prepared for the address translation part value, and the selection of these values may be made by a mode of the CPU. As the other information for the selection, similar to the translation system selection circuit, the information representing the access destination, the kind of instruction, or a dedicated storage device are prepared and the selection is made by these information.

The method of realizing the translated address storage part A for providing the translated address information A 403 is divided significantly depending on whether it is made possible to update or made impossible.

In the case, where the translated address information A 403 is given as a fixed value which is impossible to update, as a method of giving the fixed value, there is a method of directly connect to a power supply line, and the ground. In this case, since the value is determined at the time of manufacture, the general purpose property is not provided, however, there is an advantage in which the circuit scale can be made small. Similarly, this translated address information A 403 may be given by a ROM.

In the case, where the translated address information A 403 is made possible to update, as a method of storing the translated address information, there is a method of storing by a register, and a method of storing by a non-volatile memory. In the former, a necessary value is reserved as a value at the time resetting, and if the other value becomes necessary, this value is set again and then access is performed. The value can be changed even after the manufacture of hardware, and hence high general purpose property is provided. In the latter, contrary to the former, there is an advantage in which the value is maintained once it is set, and there is no need to set again. When the address space of the translated address 107 is wider with respect to the original address 106, and when the difference is given with the address translation part value, if this address translation part value is made to be rewritable, there is an advantage in which by rewriting the address translation part value, it is possible to access from the narrow address space to an arbitrary part of the wide address space.

Figure 7:
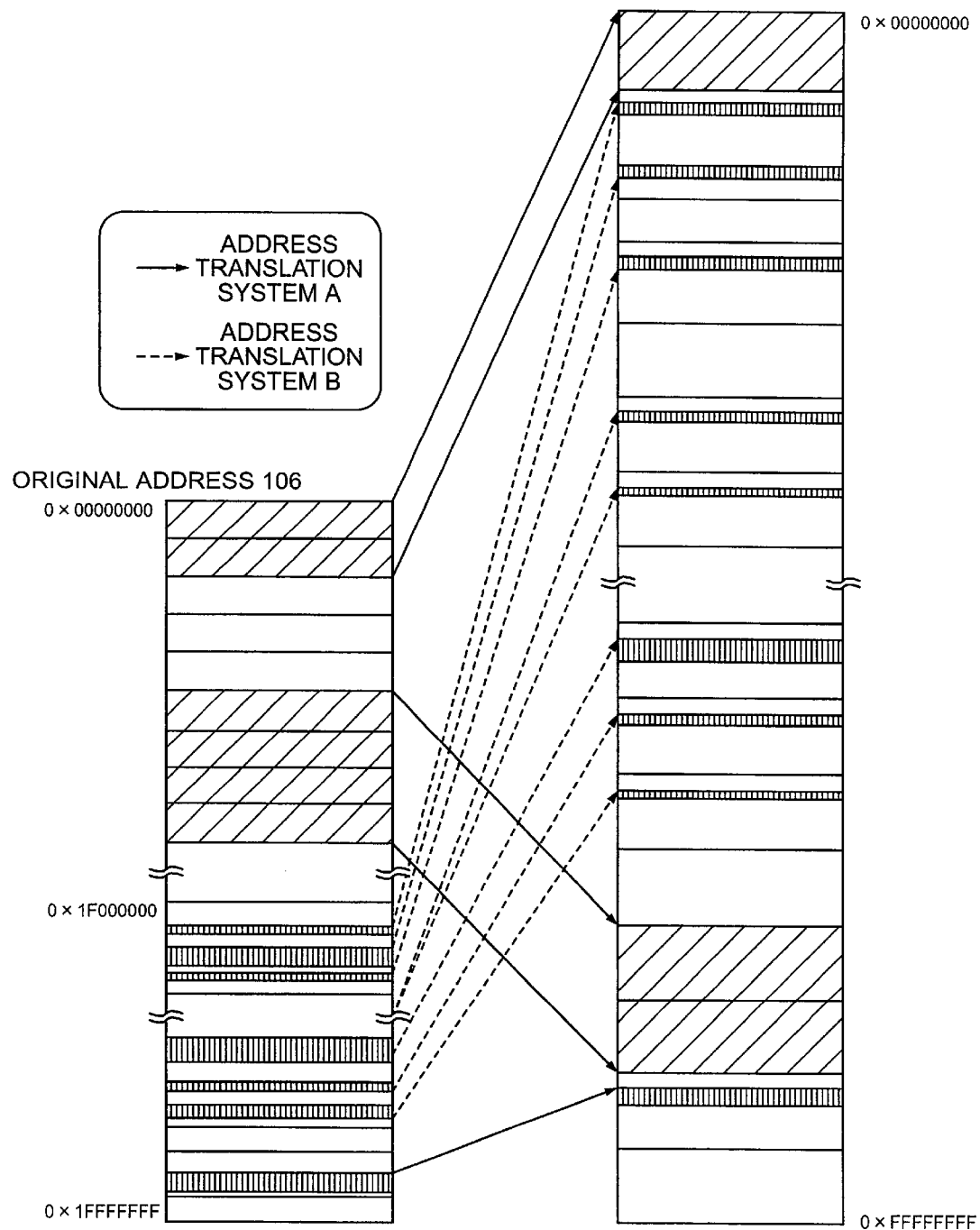
FIG. 7 is an overall diagram of an address translation map of one embodiment of the present invention.
Figure 11:
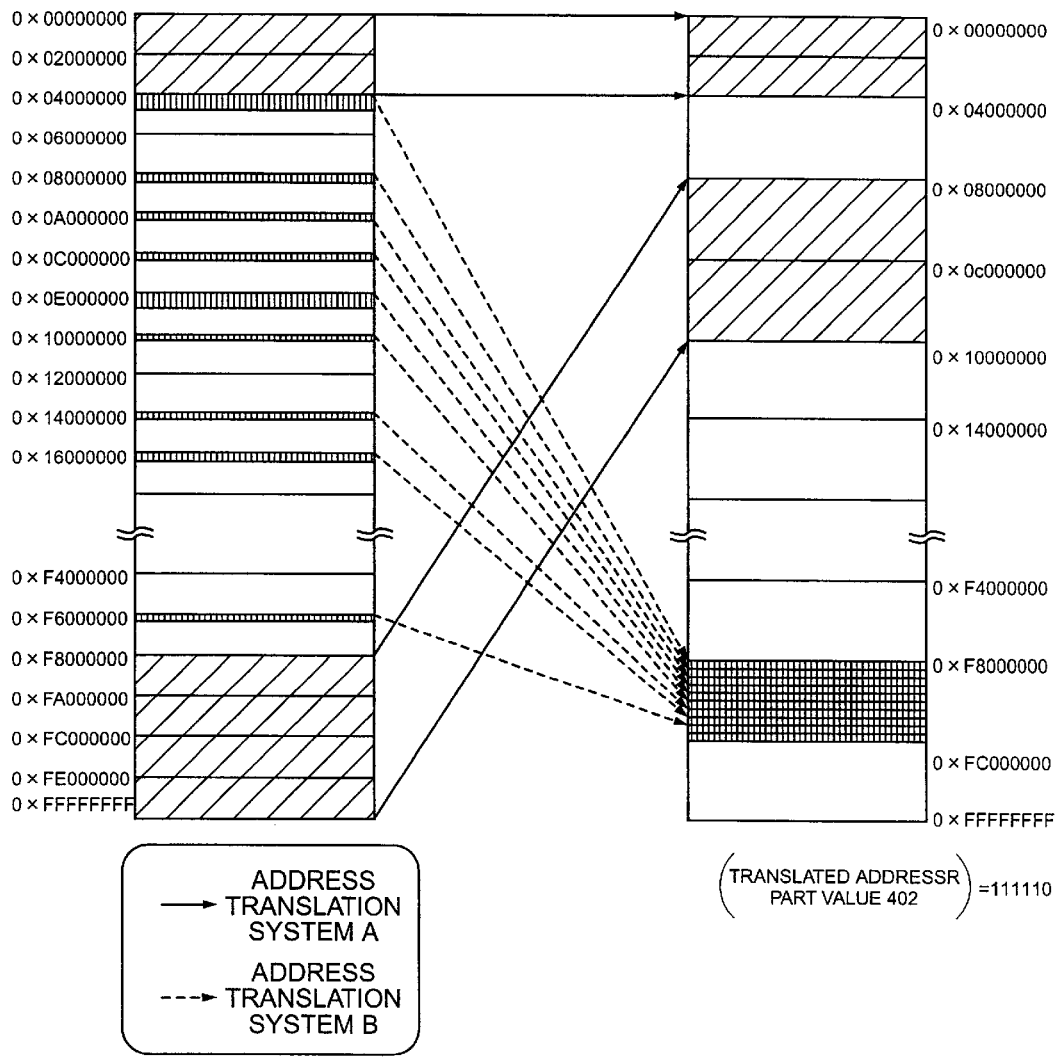
FIG. 11 shows a typical example 2 of an address translation map.
Figure 12:
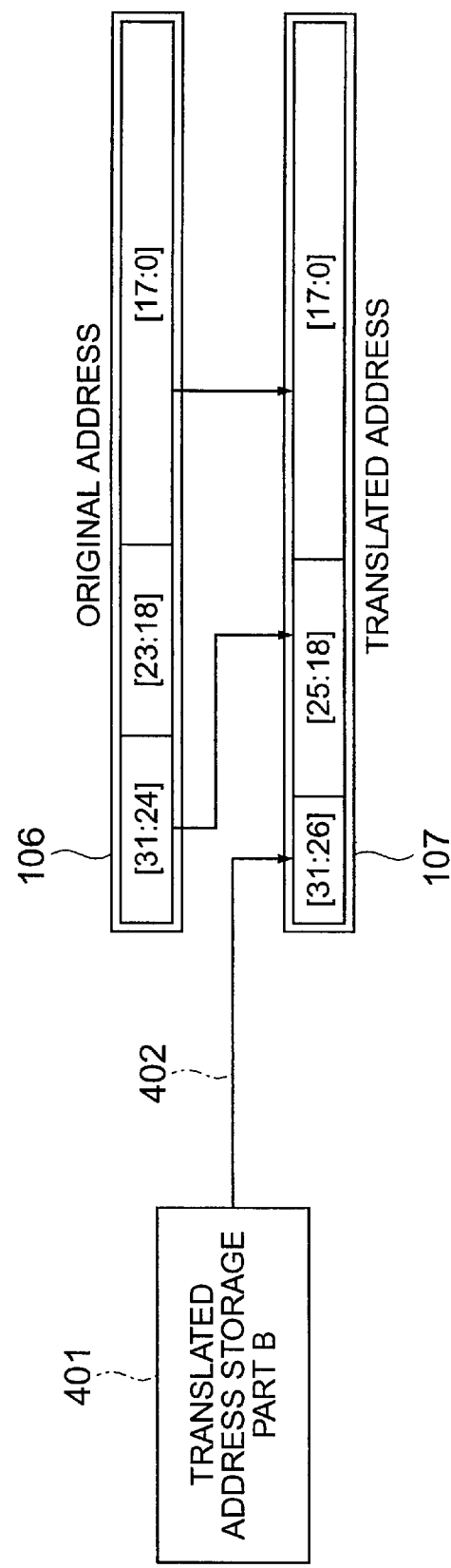
FIG. 12 is a type diagram of the address translation system B of a typical example 2 of the address translation map.

The Other Embodiments of Circuit 103 for Realizing Address Translation System B In the above-mentioned embodiment, for the address translation represented in FIG. 7, the address translation sub-circuit B 103 is used. When considering only the address translation system B, here, it is regarded that the expansion manipulation shown in FIG. 11 is being performed. At this time, as the address translation method, a part of the original address 106 is used as the further upper bits of the translated address 107. It is made possible to access from a narrow limited address space to a wide distributed space with regularity. When individual regions distributed by this translation is small, since there is no need to update the translated address information 402 each time access is to be made, the amount of change of software is small and the man-hour can be reduced. Also the circuit scale is small.

As the other embodiment relating to the address translation system B, there is a translation represented in FIG. 11. When considering only the address translation system B, it is regarded that a contraction manipulation is performed in which the access regions distributed widely on the address space are translated to one part of the address space. This translation can be realized by using a part of the original address 106 as further lower bits of the translated address 107. By virtue of this, similar to the above, since there is no need to update the translated address information 402 each time the access is to be made, software can be utilized with small amount of change, and the execution speed is not decreased. Also the circuit scale is small. The address translation system B defined here includes, other than those typical examples shown in FIGS. 9 to 12, all the address translations used in such cases where the address width is different, and the permutation of the original address 107 is performed.

The method of realizing the translated address storage part B for providing the translated address information B 402 is divided significantly depending on whether it is made possible to update or made impossible.

In the case, where the translated address information B 402 is given as a fixed value which is impossible to update, the translated address information signal, may be fixed by directly connecting to a power supply line, and the ground, or may be given by a ROM. In these methods, although there is no general purpose property, the increase of the hardware cost can be suppressed.

In the case, where the translated address information B 402 is made possible to update, there is a method of storing the translated address information by a register and a method of storing by a non-volatile memory. In the former, a necessary value is reserved as a value at the time of resetting, and if the other value becomes necessary, this value is set again and then access is performed. The value can be changed even after the manufacture of hardware, and hence high general purpose property is provided. In the latter, contrary to the former, there is an advantage in which the value is maintained once it is set, and there is no need to set again.

The Other Embodiments of Translation System Selection Circuit 105

In the above-mentioned embodiment, the selection of the address translation system is performed according to the upper bits of the original address 106 and the access destination output from the master circuit 300. It will be shown in line with FIG. 2 below.

As the other selection method, in the case where this data processor includes a circuit having a plurality of operation modes such as a CPU, the translation system may be selected according to its operation mode. For example, when its CPU has a privilege mode which is used only by a particular software such as an operating system (OS), and a normal mode used by normal application, in the privilege mode, the output of the circuit 103 realizing the address translation system B is selected, and in the normal mode, the output of the circuit 102 realizing the address translation system A is selected.

Furthermore, by separately preparing a storage device such as a register, and the translation system may be selected by a translation system selection flag value. For example, a storage device of several bits is prepared, and when the translation system selection flag value is 0, a translated address output from the address translation sub-circuit A 102 is selected, and when its value is 1, a translated address output from the address translation sub-circuit C 104 is selected, and when its value is 3, the address selection system is selected by a part of the original address 106 or by the kind of instruction accompanied by it. Of course, the translation system selection flag storage device is not limited to the register.

Also, when the information representing the kind of instruction is provided as the information accompanied by this address line, the translation system may be selected by this.

Also, the selection may be done by a composite condition of the part of the original address 106, the access destination, the operation mode, the information indicating the kind of instruction accompanied by the address, the translation system selection flag value stored in the storage device beforehand.

When the address translation system selection circuit 105 is utilized, it becomes also possible to make the address translation circuit have the effect more than the simple address translation. For example, the function to change the memory to be used between a burst transfer for transferring a plurality of data subsequent to a continuous address, and the other transfer.

The Other Embodiments of the Address Translation Circuit 101

Figure 13:
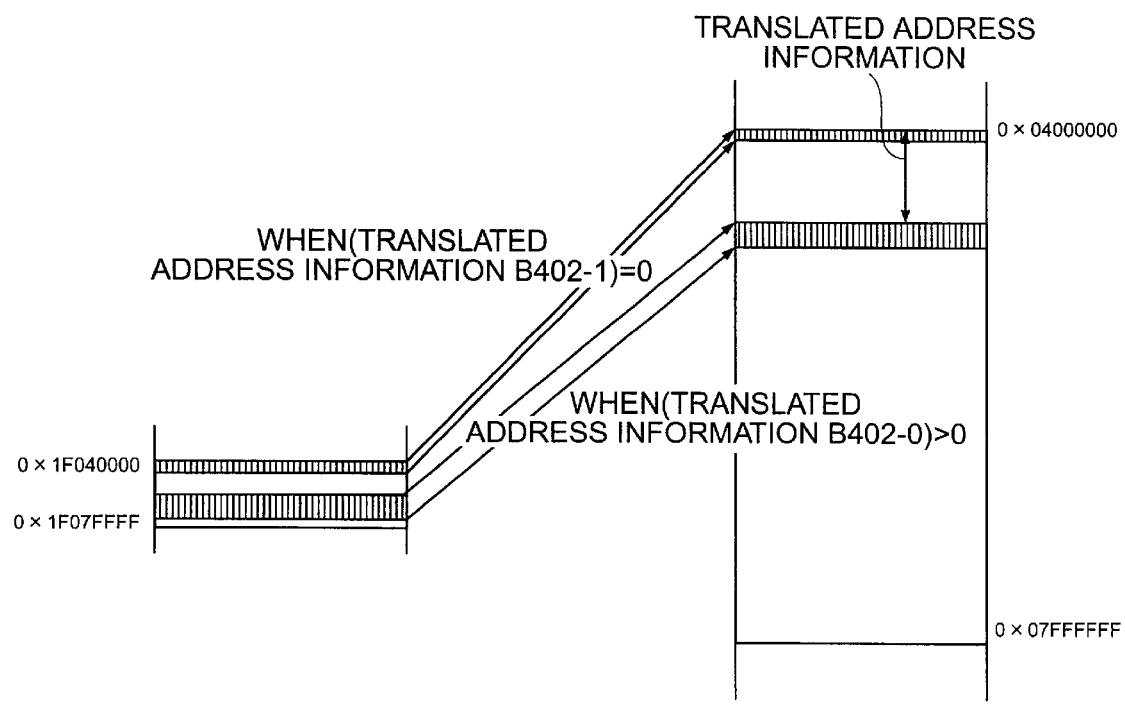
FIG. 13 shows an example of the translation system B at the time of translation of the typical example 1 of the address translation map.

The address translation circuit 101 included in the present invention includes at least one of the circuits 102 for realizing the above-mentioned address translation system A, and at least one of the circuits 103 for realizing the above-mentioned address translation system B. For example, a plurality of address translation sub-circuits B 103 are prepared, and if different pieces of translated address information B are given respectively, without updating the translated address information B, it is possible to access to different parts in a unit block of the translated address 107 space (FIG. 13). FIG. 13 represents an example of the translation system B at the time of translation shown in FIG. 10. As shown above, it is effective in the case where regions to be accessed are respectively disposed at the head and the intermediate position of the unit block of the translated address space.

Furthermore, in addition to at least one or more address translation sub-circuits A 102 and at least one or more address translation sub-circuits B 103, it may include an address translation sub-circuit C 104 for realizing the other translation system. Alternatively, it may include a circuit which outputs an address as it is without performing any translation. This is effective, when it is desired to directly connect the circuit which has been inherently connected, to the master circuit 300 through the address translation circuit 101.

Also, regarding the original address 106 and the translated address 107, either of these may have a wider address line width, or may be equal.

The Other Embodiments of Data Processor Including Address Translation Circuit 101

Figure 14:
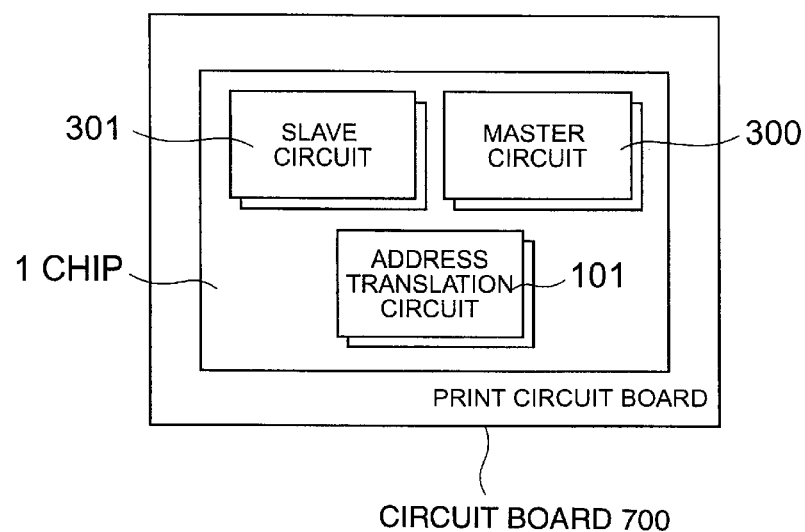
FIG. 14 is a diagram of a first data processor configuration example.
Figure 15:
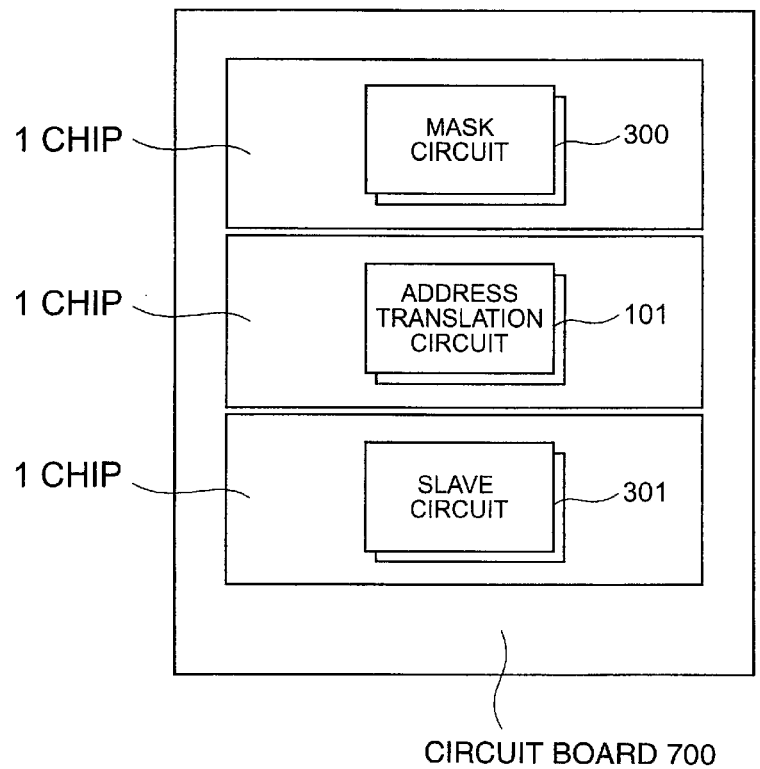
FIG. 15 is a diagram of a second data processor configuration example.
Figure 16:
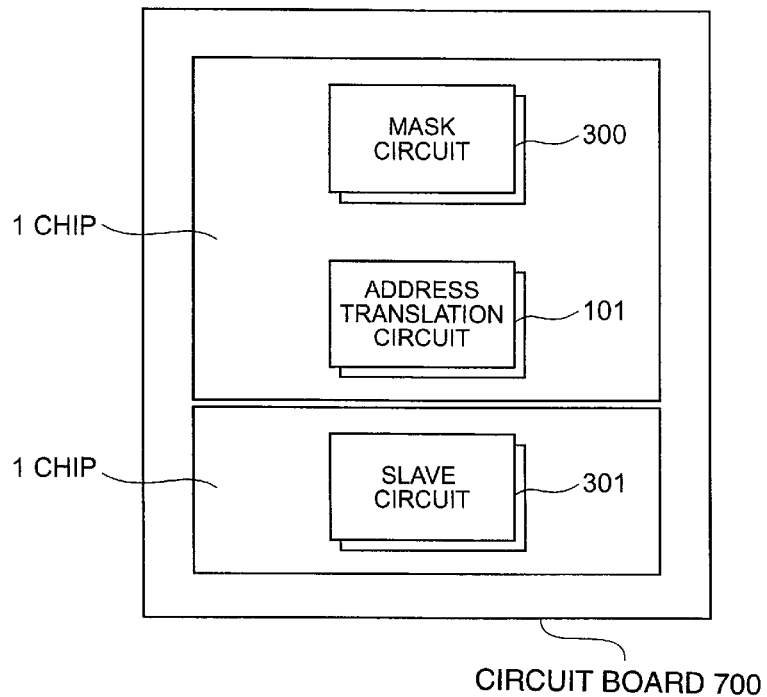
FIG. 16 is a diagram of a third data processor configuration example.
Figure 17:
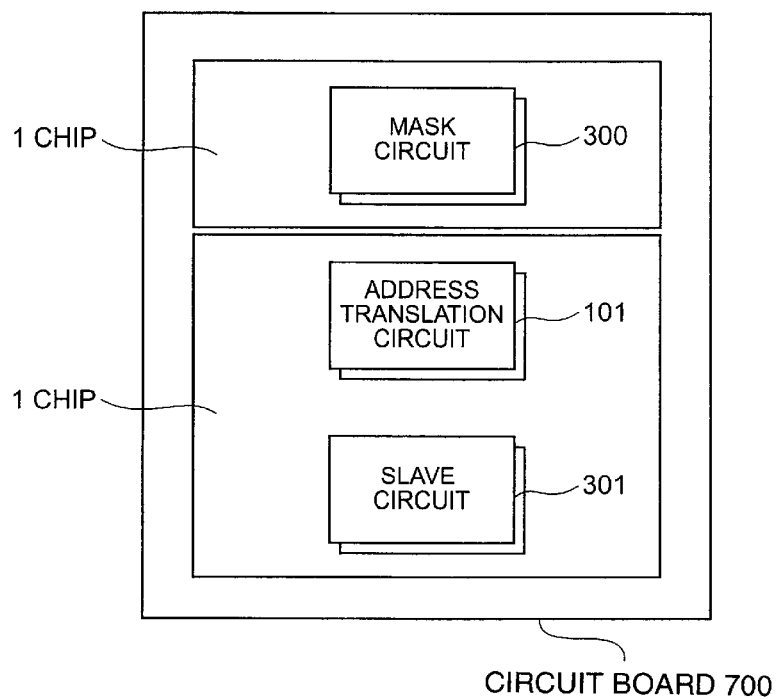
FIG. 17 is a diagram of a fourth data processor configuration example.

The present address translation circuit 101, and the master circuit 300 for inputting the original address 106 to the address translation circuit 101, and the slave circuit 301 which is the output destination of the translated address are not necessarily positioned on the same chip, and may be disposed on different chips and connected on a circuit board 700. This configuration is also within the range of the present invention. FIG. 14 shows a first example in which the address translation circuit 101, the master circuit 300, and the slave circuit 301 are formed on the same chip. Furthermore, FIG. 15 shows a second example in which the address translation circuit 101, the master circuit 300, and the slave circuit 301 are formed on respectively different chips and they are connected on the circuit board 700 to form the data processor. Also, FIG. 16 shows a third example in which the address translation circuit 101 and the master circuit 300 are formed on the same chip, and the slave circuit 301 is formed on another chip and they are connected on the circuit board 700 to form the data processor. Furthermore, FIG. 17 shows a fourth example in which the address translation circuit 101 and the slave circuit 301 are formed on the same chip, and the request transmitting circuit 300 is formed on another chip and they are connected on the circuit board 700 to form the data processor.

Figure 18:
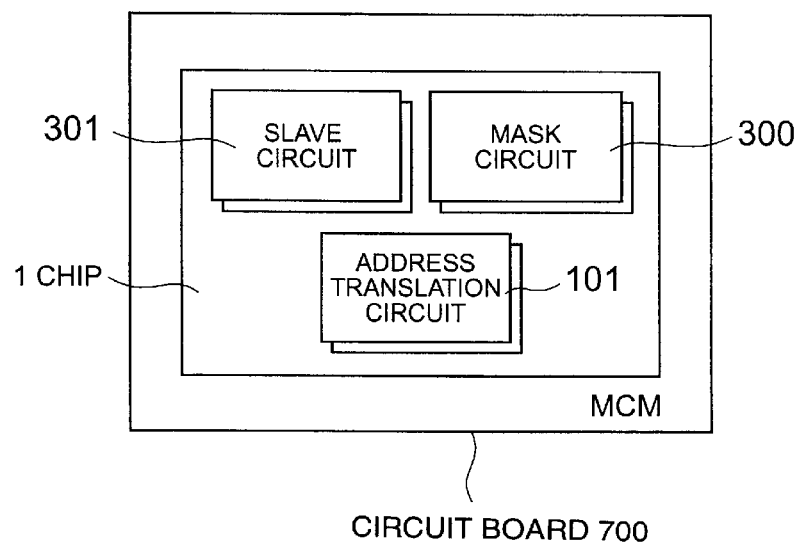
FIG. 18 is a diagram of a fifth data processor configuration example.
Figure 19:
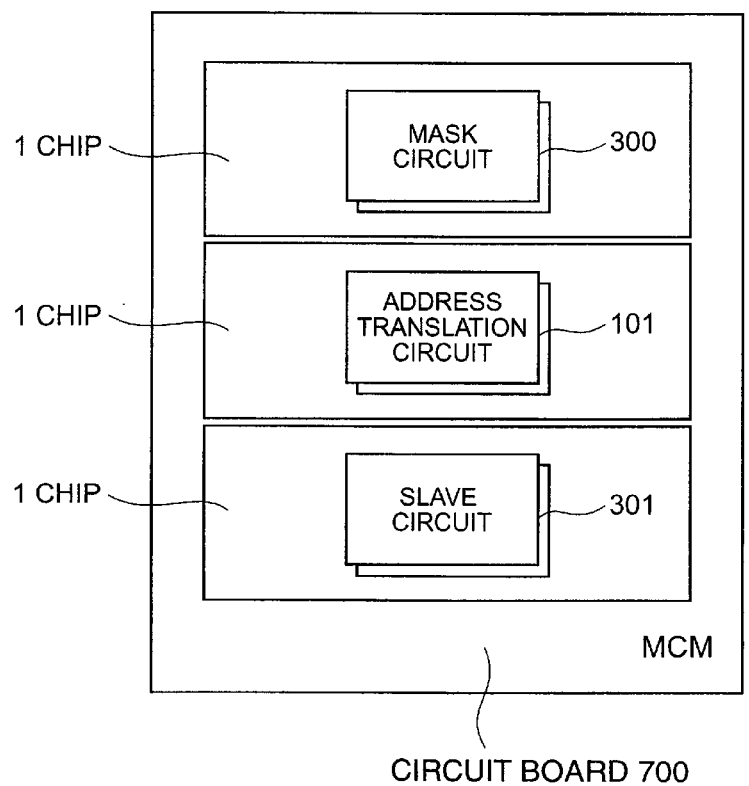
FIG. 19 is a diagram of a sixth data processor configuration example.
Figure 20:
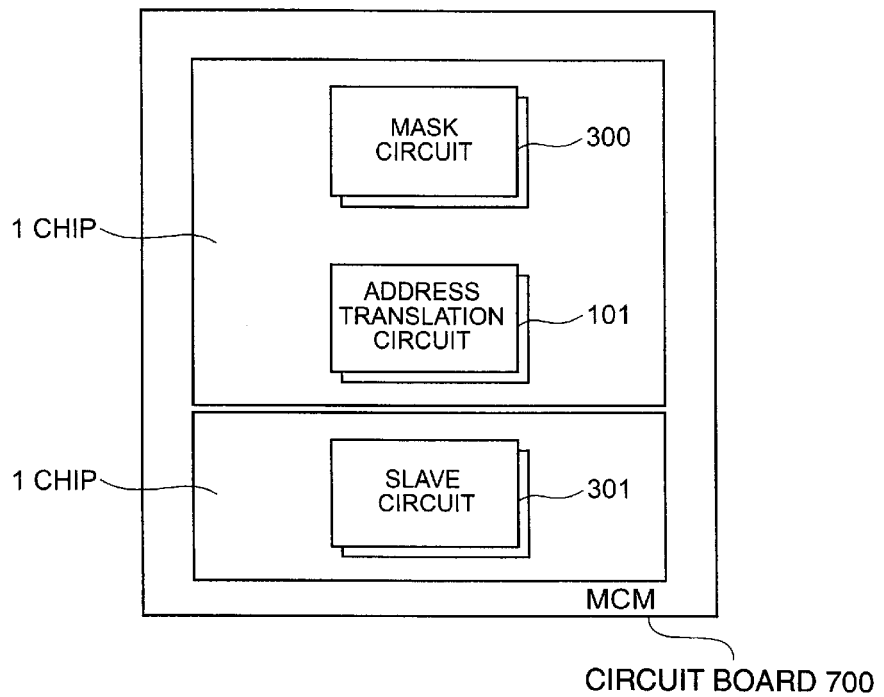
FIG. 20 is a diagram of a seventh data processor configuration example.
Figure 21:
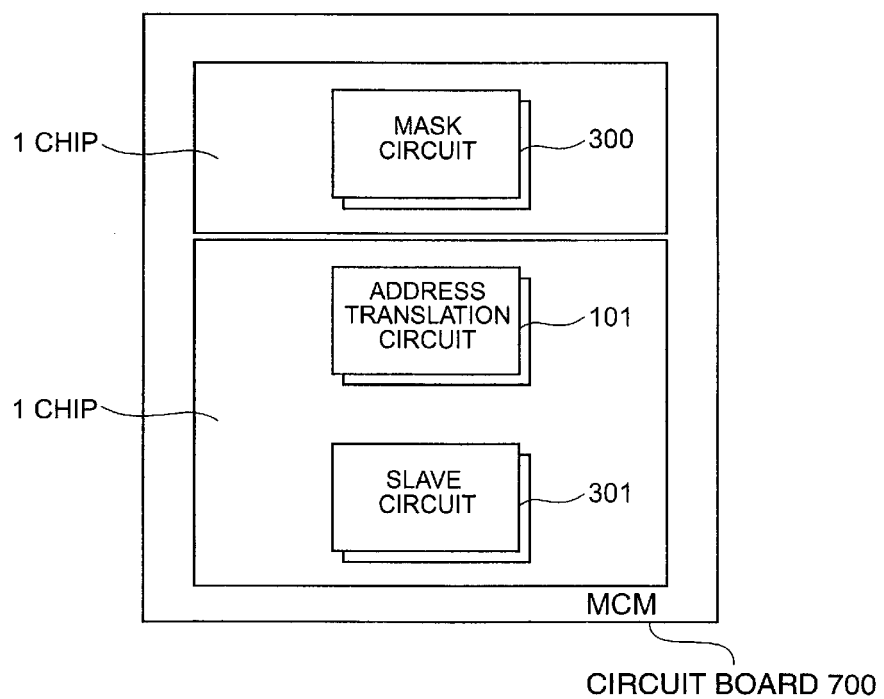
FIG. 21 is a diagram of a eighth data processor configuration example.

Furthermore, the present invention includes in addition to the first to fourth examples in which as shown in FIGS. 14 to 17, the data processor is formed on the print circuit board, the fifth to eighth examples in which as shown in FIGS. 18 to 21, a plurality of chips are packaged into one as a MCM (Multi Chip Module). That is, FIG. 18 is the fifth example in which the address translation circuit 101, the master circuit 300, and the slave circuit 301 are formed on the same chip, and other electronic parts such as a chip capacitor or the like (not shown) are mounted on the MCM substrate to form a data process multi chip module. Also, FIG. 19 shows the sixth example in which the address translation circuit 101, the master circuit 300, and the slave circuit 301 are formed respectively on different chips and they are connected on the MCM circuit board 700 to form a data process multi chip module. Also, FIG. 20 shows the seventh example in which the address translation circuit 101 and the master circuit 300 are formed on the same chip, and the slave circuit 301 is formed on another chip and they are connected on the MCM circuit board 700 to form a data process multi chip module. Also, FIG. 21 shows the eighth example in which the address translation circuit 101 and the slave circuit 301 are formed on the same chip, and the request transmitting circuit 300 is formed on another chip and they are connected on the MCM circuit board 700 to form a data process multi chip module. In the above-mentioned examples, from the fifth to the eighth, as compared with the case where the print circuit board is used, the electronic parts such as the chip capacitor, and simplex resistor element or the like, other than the main circuits such as the master circuit, the address translation circuit and the slave circuit or the like, are mounted on the MCM substrate and packaged, and thus, there is a merit in which the mounting area can be reduced, and the handling at the time of mounting becomes easy. Furthermore, as compared with the case where the above-mentioned main circuits and the like are formed onto one chip, since it is possible to manufacture a simplex chip by using the existing design assets, and to assemble these chips, the development cost of the chip is low, and the yield is high as compared with the one chip structure, and there is a merit of reducing the cost.

In the foregoing, the invention made by our inventors is described concretely based on the embodiments, however, the present invention is not limited to this, and it goes without saying that various variations are possible in the range without departing from the gist of the invention. For example, a plurality of master circuits 300 may be connected to the address translation circuit 101. Also, a plurality of slave circuits 301 may be connected to the address translation circuit 101. Also, a plurality of address translation circuits 101 relating the present invention may be contained within the data processor.

The advantages offered by the typical aspect of the invention disclosed in the present application will be described briefly below.

In the data processor, it is possible to operate the software developed for the existing circuit with a minimum change, and hence the data processor which enables to reduce the man-power of the programmer and to reduce the development cost of the software can be realized. Also, the data processor which enables to suppress the increase of the circuit scale to the minimum can be realized.

What is claimed is:

1. A data processor comprising:

a plurality of master circuits for issuing an access request to other circuits;

one or more slave circuits receiving the access request from said master circuits for performing processing; and an address translation circuit disposed between said master circuits and said slave circuits, for performing address translation of an original address output from said master circuits and for outputting a translated address to said slave circuits, wherein the number of said address translation circuit is one or more, and equal to or less than the number of said master circuits;

a translated address storage part, and wherein, said address translation circuit comprises:

a plurality of address translation sub-circuits for performing address translation on the original address independently; and a circuit for selecting a translated address from translated results of said plurality of address translation sub-circuits included in said address translation circuit, according to address translation system selection information; and wherein, at least one of said address translation circuits receives as inputs, in addition to the original address, the address translation system selection information, and the translated address information from said translated address storage part, and outputs the translated address to said slave circuit, and wherein, at least one of said address translation sub-circuits contained in said address translation circuit, realizes the address translation system for producing a translated address by a method of replacing a part of the original address with the translated address stored beforehand in the translated address storage part, and at least one of said address translation sub-circuits contained in said address translation circuit, realizes the address translation system for producing a translated address by a method including a manipulation of permuting a part of the original address.

2. A data processor according to claim 1, wherein, said plurality of master circuits are capable of accessing to at least one of said slave circuits which are common to said master circuits, and said address translation circuit is disposed between at least one of said plurality of master circuits and said slave circuits which are common.

3. A data processor according to claim 1, wherein, at least one of said plurality of address translation circuits outputs a translated address having a wider address line width than that of the original address.

4. A data processor according to claim 1, wherein, said address translation system selection information includes one or a plurality of: a part of the original address, an access destination, a kind of instruction, and an operation mode.

* * * * *